United States Patent
Kitamura

(10) Patent No.: US 12,430,420 B2
(45) Date of Patent: Sep. 30, 2025

(54) INFORMATION PROCESSING APPARATUS, CONTROL METHOD THEREFOR, AND PROGRAM FOR CONTROLLING PROCESSING LOADS OF UPDATED PROGRAMS

(71) Applicant: SONY INTERACTIVE ENTERTAINMENT INC., Tokyo (JP)

(72) Inventor: Shusuke Kitamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 311 days.

(21) Appl. No.: 18/015,280

(22) PCT Filed: Jul. 31, 2020

(86) PCT No.: PCT/JP2020/029557
§ 371 (c)(1),
(2) Date: Jan. 9, 2023

(87) PCT Pub. No.: WO2022/024384
PCT Pub. Date: Feb. 3, 2022

(65) Prior Publication Data
US 2023/0185900 A1    Jun. 15, 2023

(51) Int. Cl.
*G06F 21/51*    (2013.01)
(52) U.S. Cl.
CPC .................. *G06F 21/51* (2013.01)
(58) Field of Classification Search
None
See application file for complete search history.

(56) References Cited

U.S. PATENT DOCUMENTS 8,214,654 B1 *  7/2012  Wyatt ................ H04L 63/0478
                                                           713/191
8,839,222 B1 *  9/2014  Brandwine ............... G06F 8/65
                                                           717/168
(Continued)

OTHER PUBLICATIONS

International Search Report and Written Opinion dated Sep. 1, 2020, from International Patent Application No. PCT/JP2020/029557, 7 sheets including translation.
(Continued)

*Primary Examiner* — Backhean Tiv
(74) *Attorney, Agent, or Firm* — Kilpatrick Townsend & Stockton LLP

(57) ABSTRACT

[Object]
An information processing apparatus and a program for alleviating development burdens are provided.
[Solving Means]
An information processing apparatus 1 receives from a user a request to update a program file recorded in a repository and, in a predetermined manner at a time of receiving the update request, acquires reference information regarding a processing load of an execution object based on the program file. The apparatus then creates a provisional execution object based on the program file related to the received update request, and measures the processing load of the provisional execution object so as to acquire a result of the measurement as processing load information. The processing load information regarding the provisional execution object is verified on the basis of the acquired reference information, and the result of the verification is subjected to a predetermined process.

20 Claims, 3 Drawing Sheets

(56) References Cited

U.S. PATENT DOCUMENTS

| | | | | |
|---|---|---|---|---|
| 9,064,055 B2* | 6/2015 | Hu | ............ | G06F 11/3668 |
| 9,823,999 B2* | 11/2017 | Younger | ............ | G06F 8/65 |
| 9,858,176 B2* | 1/2018 | Machida | ............ | G06F 11/3692 |
| 10,210,037 B2* | 2/2019 | Flyax | ............ | G06F 11/0709 |
| 10,379,982 B2* | 8/2019 | Thompson | ............ | G06F 11/36 |
| 10,545,855 B1* | 1/2020 | Jayaswal | ............ | G06F 11/34 |
| 11,294,662 B2* | 4/2022 | Brugman | ............ | H04L 9/0643 |
| 11,480,934 B2* | 10/2022 | Jermann | ............ | G06F 9/54 |
| 12,039,319 B1* | 7/2024 | Leung | ............ | G06F 11/3688 |
| 2016/0188449 A1* | 6/2016 | Machida | ............ | G06F 11/3433 |
| | | | | 717/131 |
| 2017/0060728 A1* | 3/2017 | Younger | ............ | G06F 11/368 |
| 2018/0165084 A1* | 6/2018 | Mahimkar | ............ | G06F 8/65 |
| 2023/0185900 A1* | 6/2023 | Kitamura | ............ | G06F 21/51 |
| | | | | 726/22 |

OTHER PUBLICATIONS

Kalbarczyk, Tomasz, et al., Analyzing Performance Differences between Multiple Code Versions. 2014, [retrieved on Aug. 19, 2020], Internet: <URL:http:/web.cs.ucla.edu/~tianyi.zhang/perfdiff.pdf> in particular, 3. Methodology, 5. Future Work.

Rhysd, GitHub Action for Continuous Benchmarking, Jun. 10, 2020, [retrieved on Aug. 19, 2020], Internet: <https://github.com/rhysd/github-action-benchmark> in particular, Minimal setup.

* cited by examiner

INFORMATION PROCESSING APPARATUS, CONTROL METHOD THEREFOR, AND PROGRAM FOR CONTROLLING PROCESSING LOADS OF UPDATED PROGRAMS

TECHNICAL FIELD

The present invention relates to an information processing apparatus, a control method therefor, and a program.

BACKGROUND ART

In the course of development of computer programs in recent years, there has been extensive use of systems, such as git (https://git-scm.com), that record and manage a change history of program files in a repository provided to record the program files.

With such a system, program developers perform tasks such as recording created program files to the repository, retrieving program files from the repository for updates, and recording the updated program files to the repository.

Further, in development work involving multiple developers, it is widespread practice for one developer, having updated a program file, to make a pull request asking other developers to perform a review of whether or not to incorporate (merge) the history of the update (work branch) into the entire update history (target branch).

Upon receipt of the pull request, the other developers verify the content of the update and, if there is no need to modify the update, merge the history of the update to the target branch.

SUMMARY

Technical Problem

In the above-described existing systems, however, an evaluation may or may not be performed of the processing load of an execution object based on the program file that has been updated. In the case where an update that will increase the processing load has been made unintentionally and merged to the target branch without being evaluated, the subsequently discovered increase of the processing load may well require modification. In that case, it is not evident in which update in the past has been exceeded by the current update in terms of processing load. This has placed an undue burden on program development.

The present invention has been made in view of the above circumstances. An object of the invention is therefore to provide an information processing apparatus and a program for alleviating the above-mentioned burden on program development.

Solution to Problem

According to one embodiment of the present invention for solving the above-mentioned problem, there is provided an information processing apparatus including management means for managing a repository to which a program file is recorded, reception means for receiving from a user a request to update a program file recorded in the repository, reference information acquisition means for acquiring, in a predetermined manner at a time of receiving the update request, reference information regarding a processing load of an execution object based on the program file, provisional object creation means for creating a provisional execution object on the basis of the program file related to the received update request, processing load information acquisition means for measuring the processing load of the provisional execution object to acquire a result of the measurement as processing load information, and verification means for verifying the processing load information regarding the provisional execution object on the basis of the acquired reference information, in which the result of the verification is subjected to a predetermined process.

Advantageous Effect of Invention

According to the present invention, the burden on program development is alleviated.

DESCRIPTION OF EMBODIMENT

An embodiment of the present invention is described below with reference to the accompanying drawings. An information processing apparatus 1 as one embodiment of this invention supports development of execution objects (programs) that are executed by a program execution apparatus such as a home-use game console, a smartphone, a tablet terminal, or a personal computer.

Figure 1:
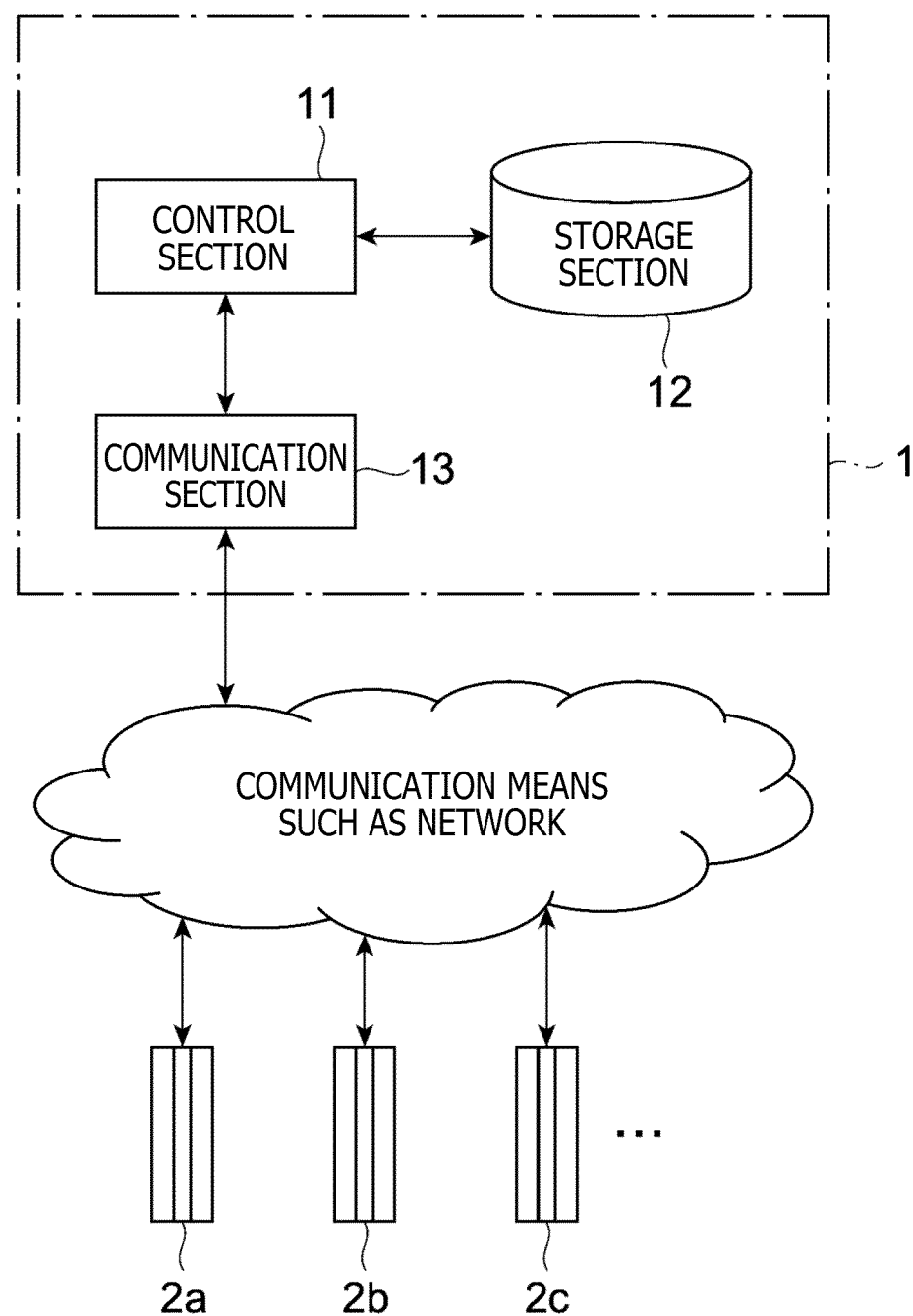
FIG. 1 is a block diagram depicting an exemplary configuration of an information processing apparatus embodying the present invention.

The information processing apparatus 1 embodying the present invention includes a control section 11, a storage section 12, and a communication section 13, as depicted in FIG. 1. In this embodiment, the information processing apparatus 1 is communicably connected with multiple execution apparatuses 2a, 2b, etc.

The control section 11 is a program-controlled device such as a computer processing unit (CPU) that operates as per the execution objects stored in the storage section 12. In this embodiment, the control section 11 manages a repository for program file storage. The repository stores a program file related to at least one execution object. There may be multiple program files related to each execution object. At the time of receiving from a user a request to update a program file recorded in the repository, the control section 11 acquires, in a predetermined manner, reference information regarding the processing load of the execution object based on the program file.

The control section 11 further creates a provisional execution object according to the result of integrating the program file related to the received update request with the program files in the repository, to measure the processing load of the provisional execution object thus created. The control section 11 acquires the result of the measurement as processing load information.

On the basis of the reference information acquired earlier, the control section 11 verifies the processing load information regarding the provisional execution object. According to the result of the verification, the control section 11 performs predetermined processes. The details of the processes by the control section 11 will be discussed later.

The storage section 12 includes a disk device. In this embodiment, the storage section 12 holds the execution objects (programs) to be executed by the control section 11. The execution objects (programs) may be provided stored on a computer-readable non-transitory recording medium and copied from there into the storage section 12.

Also in this embodiment, the storage section 12 functions as the repository for program file storage. Further, the storage section 12 includes a memory device that functions as a work memory for the control section 11. Alternatively, as long as it is accessible from the information processing apparatus 1, the repository may be held in the storage of some other computer equipment on a network.

The communication section 13 is a network interface communicably connected with a user terminal (which may be a personal computer) via the network. The communication section 13 receives various instructions including requests to update program files from the user terminal and outputs the received instructions to the control section 11. Also, according to the instructions input from the control section 11, the communication section 13 outputs diverse information to the user terminal.

In this embodiment, the information processing apparatus 1 is communicably connected with multiple execution apparatuses 2a, 2b, etc., (generically referred to as the execution apparatus 2 where there is no need to distinguish the individual apparatuses from each other). Here, each execution apparatus 2 is computer equipment such as a home-use game console capable of processing the execution objects created by the information processing apparatus 1.

Figure 2:
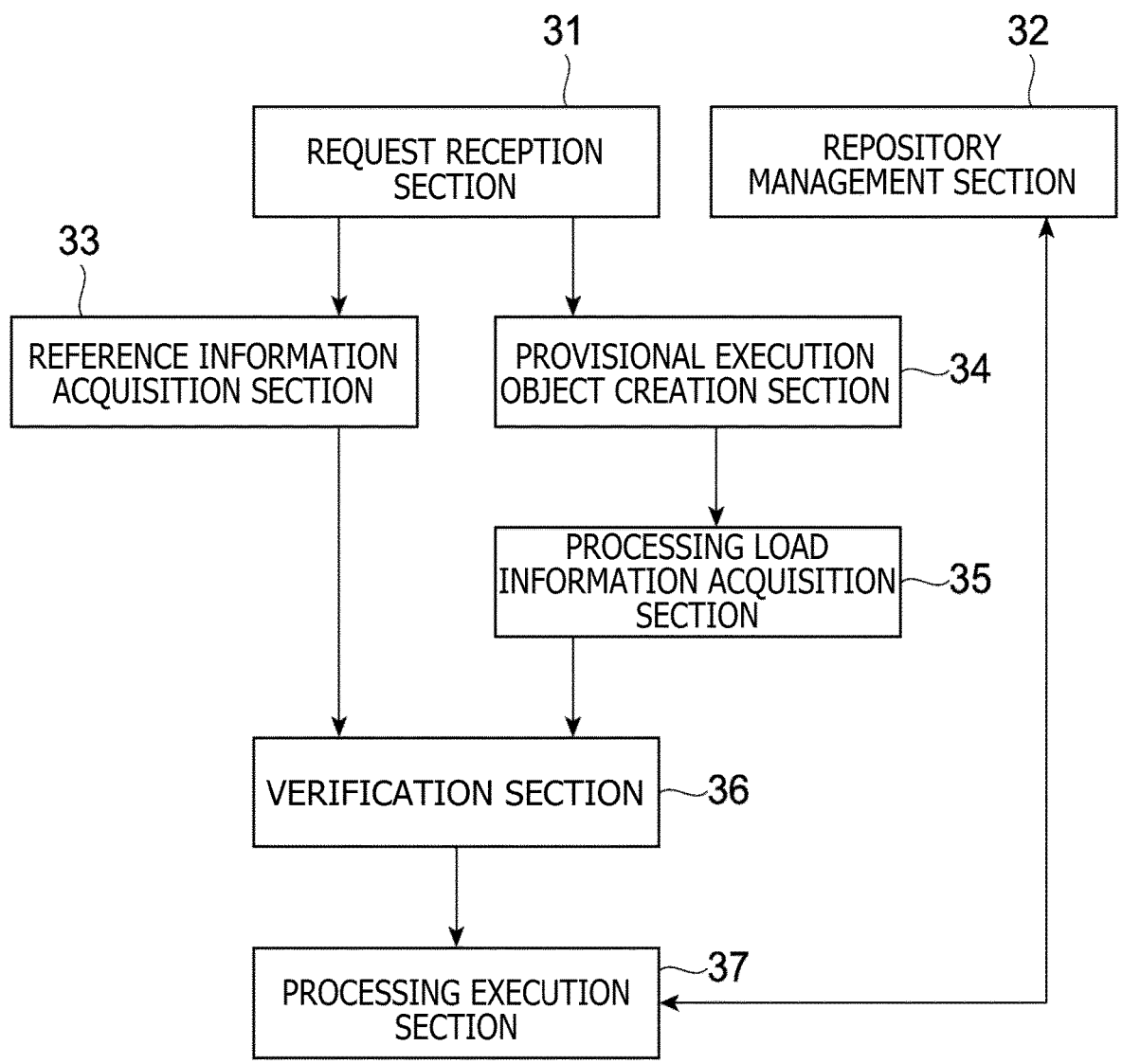
FIG. 2 is a functional block diagram depicting an example of the information processing apparatus embodying the present invention.

Explained next are the workings of the control section 11 in the information processing apparatus 1 of this embodiment. The control section 11 operates on the basis of the execution objects held in the storage section 12. As depicted in FIG. 2, the control section 11 is configured functionally with a request reception section 31, a repository management section 32, a reference information acquisition section 33, a provisional execution object creation section 34, a processing load information acquisition section 35, a verification section 36, and a processing execution section 37.

The request reception section 31 receives operating instructions regarding the repository from the user. The operating instructions include diverse instructions such as an instruction to store a program file into the repository, an instruction to retrieve a program file from the repository, an instruction to divide or integrate the change history of program files (branches) in the repository, and a request to update a program file.

According to the instructions received by the request reception section 31, the repository management section 32 performs a process of storing program files into the repository in the storage section 12 and a process of updating stored program files, among other processes.

In one example of this embodiment, the user intending to update a program file creates a local branch by copying the branch (target branch) related to the program file (also referred to as the original program file if there is a need for distinction) currently stored in the repository. The user then updates the program file in the local branch. As explained above, there may be multiple program files for use in creating one execution object, and the user updates at least one of these program files. If the update turns out to be appropriate, the user requests the administrator of the target branch to incorporate (merge) the local branch into the target branch. If the administrator consents to the request, the updated program file is allowed to replace the original program file, and the local branch is merged to the target branch.

In one example of this embodiment, these processes of the request reception section 31 and the repository management section 32 are implemented by git.

At the time the request reception section 31 receives a program file update request from the user, the reference information acquisition section 33 acquires, in a predetermined manner, the reference information regarding the processing load of the execution object based on the program file (pre-update program file) related to the update request. Of a variety of methods for acquiring the reference information, the method assumed to be used here involves measuring the processing load of the execution object created on the basis of the original program file stored in the repository at the time of receiving the update request to acquire the result of the measurement as the reference information. Other methods of acquiring the reference information will be discussed later.

In this example, the reference information acquisition section 33 outputs to the execution apparatus 2a an execution object Pcur created on the basis of the original program files (a program file group including the original program files) stored in the repository at least at the time of receiving the update request to make the execution apparatus 2a execute the execution object Pcur. The reference information acquisition section 33 then acquires information regarding the processing load on the execution apparatus 2a as the reference information. Here, the information regarding the processing load may include, for example, a time Tcur to elapse until a predetermined screen appears following the start of execution of the above-mentioned execution object Pcur (i.e., start-up time).

The provisional execution object creation section 34 creates a provisional execution object based on the result of integrating the program file related to the received update request (updated program file) with the program files in the repository (program files excluding the original program file corresponding to the update program file in the program file group).

The processing load information acquisition section 35 measures the processing load of the provisional execution object created by the provisional execution object creation section 34, to acquire the result of the measurement as the processing load information. Specifically, the processing load information acquisition section 35 outputs a provisional execution object Pmod created by the provisional execution object creation section 34 to the execution apparatus 2b (different from the execution apparatus 2a to which the reference information acquisition section 33 has output the execution object Pcur). The processing load information acquisition section 35 then acquires information regarding the processing load on the execution apparatus 2b. Here, the information regarding the processing load is assumed to include information comparable to the reference information acquired by the reference information acquisition section 33. That is, the information includes a time Tmod to elapse until a predetermined screen appears following the start of execution by the execution apparatus 2b of the above-mentioned execution object Pmod (i.e., start-up time).

The verification section 36 verifies the processing load information regarding the provisional execution object Pmod acquired by the processing load information acquisition section 35, on the basis of the reference information obtained by the reference information acquisition section 33. Specifically, the verification section 36 compares the start-up time Tcur (at the execution apparatus 2a) of the execution object Pcur acquired by the reference information acquisition section 33 as the reference information, with the start-up time Tmod (at the execution apparatus 2b) of the provisional execution object Pmod acquired by the processing load information acquisition section 35.

For example, the verification section 36 compares an absolute value $\alpha=|Tmod-Tcur|$ of the difference between Tmod and Tcur with a predetermined threshold value $\theta$ ($\theta>0$). If the result of the comparison reveals that $\alpha>\theta$, then the verification section 36 determines that the start-up time has changed significantly as a result of the program file update. The verification section 36 proceeds to determine whether or not Tmod>Tcur. If it is determined here that Tmod<Tcur, then the verification section 36 determines that the change in start-up time resulting from the program file update is appropriate, and outputs information to that effect to the processing execution section 37. If it is determined that Tmod>Tcur, the verification section 36 determines that there is a significant increase in start-up time as a result of the program file update, and outputs information to that effect to the processing execution section 37.

On the other hand, if it is determined that $\alpha \leq \theta$, the verification section 36 determines that the change in start-up time resulting from the program file update is appropriate and not significant, and outputs information to that effect to the processing execution section 37.

The processing execution section 37 receives the information indicative of the result of the determination by the verification section 36, and presents the user with the received information. Also, on the basis of the result of the determination by the verification section 36, the processing execution section 37 may control whether or not to permit replacement of the original program file with the updated program file.

[Other Examples of Processing by Verification Section]

It has been explained above that the reference information acquisition section 33 acquires as the reference information the start-up time Tcur (at the execution apparatus 2a) of the execution object Pcur immediately before the update, and that the processing load information acquisition section 35 obtains the start-up time Tmod (at the execution apparatus 2b) of the provisional execution object Pmod. It has been also explained that the verification section 36 verifies whether or not the change in processing load is significant by determining whether or not the absolute value $\alpha=|Tmod-Tcur|$ of the difference between Tmod and Tcur is larger than a threshold value. This, however, is not limitative of the embodiment.

In another example of this embodiment, the reference information acquisition section 33 outputs to at least one execution apparatus 2a, 2b, etc., the previously built execution objects including the execution object Pcur immediately before the update and created on the basis of the original program files stored in the repository at the time of receiving the update request. The reference information acquisition section 33 then acquires, multiple times as the reference information, the information regarding the processing load resulting from the processing of the execution object by the execution apparatus 2 that has received the output execution object.

Here, one method of acquiring the reference information n times (n is an integer larger than 2) may involve having the execution object executed parallelly by k execution apparatuses 2, k being equal to or larger than n, for multiple-time reference information acquisition. As another alternative, the reference information acquisition section 33 may use k execution apparatuses 2 (k is an integer smaller than n) and have at least one of them execute the execution object multiple times to obtain the reference information. In the latter case, the reference information may be acquired beforehand regarding the execution of n−j (j is an integer smaller than n) previously built execution objects in different versions. With such reference information recordings acquired, n-batch reference information may be obtained from j-time execution by the execution apparatus 2 of the execution object immediately before the current update.

Also, the processing load information acquisition section 35 may output the provisional execution object Pmod created by the provisional execution object creation section 34 to at least one execution apparatus 2 (which may be different from the execution apparatus 2 to which the execution object Pcur is output by the reference information acquisition section 33 in its processing) so as to acquire multiple times the processing load information regarding the processing load at the time the output-destination execution apparatus 2 processes the provisional execution object. In this example, too, one method for acquiring the processing load information multiple times may involve having the execution object executed parallelly by at least as many execution apparatuses 2 as the number of times the processing load information is acquired. Another method may involve having the execution object executed multiple times by at least one execution apparatus 2.

In this example, the start-up time Tcur for use as the reference information and the start-up time Tmod as the processing load information are each acquired multiple times (these items of information may each be obtained a different number of times).

In this example, the verification section 36 compares the distribution of the reference information acquired multiple times with the distribution of the processing load information obtained multiple times. The comparison may be performed by the verification section 36 by using any one of well-known methods of verification such as the Man-Whitney U test, Student's t-test, and Welch's t-test. By using any one of these methods, the verification section 36 tests, at risk factors of 1% to 5%, whether there is a significant difference between the distribution of the reference information and that of the processing load information.

If the result of the comparison allows the verification section 36 to determine that there exists a significant difference between the distributions, the verification section 36 then determines that there is a significant change in processing load (in terms of start-up time in this case) resulting from the program file update, and proceeds to verify whether or not a predetermined amount of statistics regarding the acquired reference information is larger than a predetermined amount of statistics regarding the processing load information. Here, the amount of statistics may be a median value or a mean value, for example (mean value is preferred if the data targeted for statistic computation is known to be normally distributed). As an example, if the median value of the reference information is not larger than the median value of the processing load information, the verification section 36 determines that the change in processing load resulting from the program file update is appropriate, and outputs information to that effect to the processing execution section 37. If the median value of the reference information is larger than the median value of the processing load information, the verification section 36 determines that there is a significant increase in processing load as a result of the program file update, and outputs information to that effect to the processing execution section 37.

Further, if the result of the comparison allows the verification section 36 to determine that there is no significant difference between the distributions, the verification section 36 determines that the change in processing load resulting from the program file update is appropriate, and outputs information to that effect to the processing execution section 37.

In this manner, given the reference information distribution, the verification section 36 need only be able to test or detect whether or not there is a significant change in the information regarding the processing load of the execution object created on the basis of the updated program file. Thus, instead of the statistical methods, diverse anomaly detection techniques such as the technique of anomaly detection using a neural network may be used alternatively to verify whether or not there is such a significant change.

[Operations]

The information processing apparatus 1 of this embodiment is basically configured as described above and operates as described below. The ensuing explanation concerns a case where one of the users developing an execution object to be built on the basis of multiple program files is to update at least one of these program files.

The user updating the program file issues an instruction to copy the target branch related to the program files currently stored in the repository. Given the instruction, the information processing apparatus 1 creates a local branch by copying the target branch.

The user edits and updates the program file related to the local branch. Here, the user may create a new program file and add it to the local branch.

After updating the program file, the user gives the information processing apparatus 1 an update request instruction to register the update of the program file (i.e., to commit and finalize the program file update in the local branch). Upon receipt of the update request, the information processing apparatus 1 starts subsequent processes.

Figure 3:
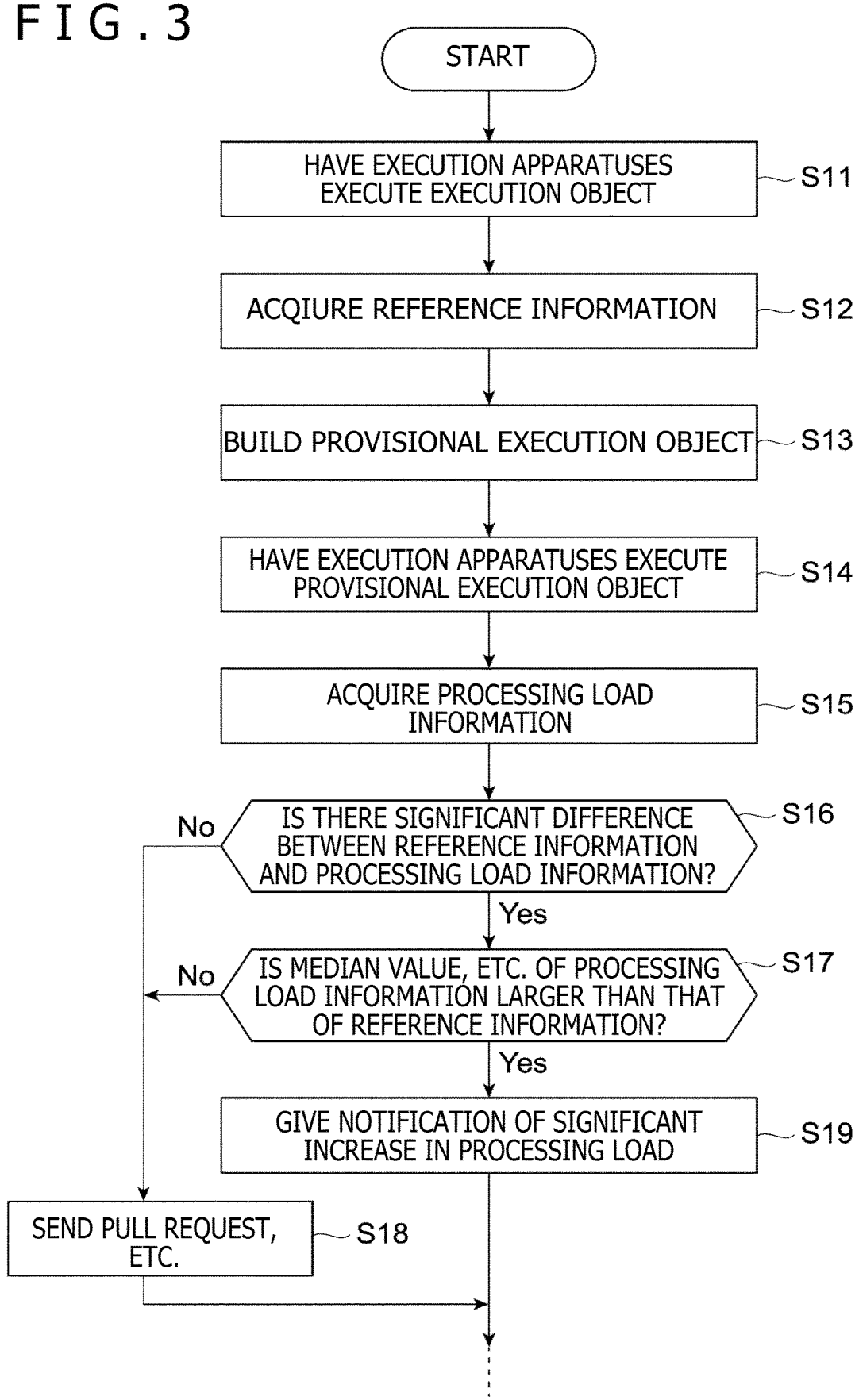
FIG. 3 is a flowchart depicting exemplary operations of the information processing apparatus embodying the present invention.

Ad depicted in FIG. 3, the information processing apparatus 1 outputs to multiple execution apparatuses 2a, 2b, . . . 2n the execution object Pcur created on the basis of the original program files recorded in the repository at the time of receiving the update request, and causes these execution apparatuses to execute the execution object Pcur in parallel (S11). The information processing apparatus 1 then acquires, as reference information, measured values of the start-up time Tcur that elapses until a predetermined screen appears following the start of execution by each execution apparatus of the execution object Pcur (S12). The measured values acquired of the start-up time Tcur here represent n-batch (n is an integer of at least 2) reference information.

Also, the information processing apparatus 1 creates the provisional execution object Pmod and builds it into the local branch asynchronously (i.e., parallelly) with respect to these execution apparatuses 2 in operation (S13). The program files for use in building here include the program files updated by the user and those that are not updated by the user and have the same content as the original program files.

The information processing apparatus 1 outputs the created provisional execution object Pmod to multiple execution apparatuses 2 and have each of the output-destination execution apparatuses 2 execute the provisional execution object Pmod (S14). The information processing apparatus 1 then acquires, as processing load information, measured values of the start-up time Tmod that elapses until a predetermined screen appears following the start of execution by each execution apparatus 2 of the provisional execution object Pmod (S15). The measured values acquired of the start-up time Tmod here represent m-batch (m is an integer of at least 2) processing load information. It is to be noted that the value n may be different from the value m. Whereas FIG. 3 depicts steps S11 through S15 as if they are carried out in that order for reasons of descriptive convenience, these steps may alternatively be performed in parallel as discussed above.

If it is assumed here that the execution apparatus 2 executing the provisional execution object Pmod is different from the execution apparatus 2 executing the execution object Pcur, the process of the execution apparatus 2 in step S12 may be carried out in parallel with the process of the execution apparatus 2 in step 15. In this example of the embodiment, it is preferable to unify the system software version and other conditions of the execution apparatuses 2. For this reason, the information processing apparatus 1 may issue an instruction to cause the execution apparatuses 2 used in the processes of steps S12 and S15 to update their system software in a suitably timed manner (e.g., immediately before the upcoming process or at a predetermined time of day).

By using a predetermined method, the information processing apparatus 1 tests whether or not there exists a significant difference between the distribution of m measured values of Tmod acquired in step S12 and the distribution of n measured values of Tcur obtained in step S15 (S16). Specifically, the information processing apparatus 1 tests the difference between the distributions at a risk factor of 5% by using the Man-Whitney U test.

If a significant difference is determined to exist between the distribution of m measured values of Tmod and the distribution of n measured values of Tcur (S16: Yes), the information processing apparatus 1 determines that there is a significant change in start-up time resulting from the program file update. The information processing apparatus 1 then verifies whether or not a median value Tmod_m of m Tmod values is larger than a median value Tcur_m of n Tcur values (S17). If it is determined here that Tmod_m<Tcur_m (S17: No), the information processing apparatus 1 determines that the change in start-up time resulting from the program file update is appropriate, and performs (S18) a process of requesting a review of the updated portion (pull request) by the users who manage the program files in the target branch (including the user who updates the program file and the user who determines whether or not to merge the local branch to the target branch).

Thereafter, the user having responded to the pull request performs a verification separately to determine whether or not the update is appropriate. If the verification proves that the update is appropriate, the user instructs the information processing apparatus 1 to incorporate (merge) the local branch into the target branch. At this time, the information processing apparatus 1 incorporates the updated content of the local branch into the target branch.

On the other hand, if it is determined that Tmod_m>Tcur_m in step S17 (S17: Yes), then the information processing apparatus 1 determines that there is a significant increase in start-up time resulting from the program file update, and gives a notification of information to that effect to the user who has updated the program file (S19). Given the notification, the user is able to reexamine the updated content of the program file.

If it is determined in step S16 that there is no significant difference between the distribution of m measured values of Tmod and the distribution of n measured values of Tcur (S16: No), the information processing apparatus 1 determines that there is no significant change in start-up time resulting from the program file update and goes to step S18 for continuous processing.

In this example of the embodiment, at the time of committing the program file, the information processing apparatus 1 collects and verifies the information such as start-up time regarding the processing load with no additional user intervention. As a result, in the case where there occurs a significant increase in processing load due to the program file update by the user, the user is able to know the consequence of the update more quickly than before. Also, the user can deal with the significant increase in processing load before issuing the pull request to any other user. This makes it possible to alleviate the overall development load.

[Recordings]

Further, the information processing apparatus 1 may record the processing load-related information acquired in steps S12 and S15 in the form of logs in the storage section 12 for record keeping. Here, the recordings are assumed to include dates and times at which the processing loads were measured, information identifying the branches of which the processing loads were measured, and information regarding the measured processing loads, all these information items being associated with each other.

In the case where the recordings are made as logs in this manner, the information such as Tcur and Tmod logged in steps S16 and S17 may be retrieved and subjected to various tests and processes.

[Other Examples of Method for Acquiring Reference Information]

It has been explained above that the processing loads are measured by actually having the execution apparatuses 2 execute each execution object created on the basis of the program files recorded in the repository at the time of receiving the update request. However, this is not limitative of the embodiment.

In another example of this embodiment, measurements may be made of the processing load of the execution object created on the basis of the program files recorded in the repository not only at the point in time at which the update request is received but also at least at a point in time earlier than the current update request.

In this example, by acting as the processing load information acquisition section 35, the control section 11 outputs to at least one execution apparatus 2 the provisional execution object Pmod created by the provisional execution object creation section 34. The control section 11 thus acquires multiple times the processing load information regarding the processing load at the time of causing the output-destination execution apparatus 2 to process the execution object of interest.

The control section 11 then compares the reference information with the processing load information by acting as the verification section 36. Specifically, the verification section 36 compares the distribution of the above-described multiple-batch reference information with the distribution of the processing load information acquired multiple times above. The method of the comparison may involve using the Man-Whitney U test, for example, as discussed above. By using one of such testing methods, the verification section 36 tests whether or not there exists a significant difference between the distribution of the reference information and that of the processing load information at risk factors of 1% to 5%.

The reference information may be determined beforehand without being necessarily based on the processing results of the execution objects. For example, in the case where an execution object is created for the first time, the reference information may be determined in advance regarding the processing load of the execution object created first time ever.

[Other Examples of Processing Load Information]

The information regarding the processing load, which eventually serves as the reference information and processing load information, is not limited to the information regarding start-up time as discussed above. Specifically, the information regarding the processing load may include the followings.

(1) Start-up time
(2) Time required to elapse from a start-up state until processing is terminated
(3) Time required for version upgrade
(4) Usages of hardware resources (usages of a CPU, a graphics processing unit (GPU), a memory, etc.)

In addition to the above items, the information regarding the processing loads of applications including games (including applications executed on mobile equipment) may further include the followings.

(5) Transition time of user interface screens
(6) Time required to download data from a network
(7) Time required to execute a process corresponding to a given operation
(8) Time required to elapse following execution of a given setting operation until the setting of the operation is reflected
(9) Time required to render a given screen
(10) Time required to download an application from a network
(11) Time required to install an application In this embodiment, these items of information are acquired every time a program file is committed with no additional user intervention. In the case where there is a significant change resulting from the comparison between the information before and after the program file update, the notification to that effect is given. This makes it possible, for example, to detect memory leaks or other anomalies from the information such as memory usages prior to integration with the target branch, which reduces the possibility of letting such anomalies as memory leaks be included in the end product. This also alleviates the overall development load.

Effects of Embodiment

With the information processing apparatus 1 of this embodiment, every time a program file updated by a user is to be committed to the repository, the information regarding the processing load such as the start-up time of the execution object created on the basis of the program file of interest is collected and compared with the reference information. This prevents unintentional registration of program codes of large processing loads while controlling whether or not to permit verification (pull request) by other developers. The burden of development is thus alleviated.

Furthermore, it is possible to reduce the possibility of letting program codes leading to performance degradation be included into the end product.

REFERENCE SIGNS LIST

1: Information processing apparatus
2: Execution apparatus
11: Control section
12: Storage section 13: Communication section
31: Request reception section
32: Repository management section
33: Reference information acquisition section
34: Provisional execution object creation section
35: Processing load information acquisition section
36: Verification section
37: Processing execution section

The invention claimed is:

1. An information processing apparatus comprising:
one or more storage devices comprising a repository and storing instructions; and
one or more processors, that upon execution of the instructions, are configured to perform:
managing the repository to which a program file is recorded;
receiving a request to update a program file recorded in the repository;
acquiring, in a predetermined manner at a time of receiving the request, reference information regarding a processing load of an execution object on a basis of the program file, wherein the reference information is based on a first elapsed time from a time of execution of the execution object to a time when a predetermined screen appears following the execution of the execution object;
creating a provisional execution object based on the program file related to the request;
measuring the processing load of the provisional execution object to acquire a result of the measurement as processing load information, wherein the processing load information is based on a second elapsed time from a time of execution of the provisional execution object to a time when the predetermined screen appears; and
verifying the processing load information regarding the provisional execution object on a basis of the acquired reference information, wherein
a result of the verification is subjected to a predetermined process.

2. The information processing apparatus according to claim 1, wherein the one or more processors are further configured to perform:
measuring the processing load of the execution object created on a basis of the program file recorded in the repository at the time of receiving the request; and
acquiring the result of the measurement as the reference information.

3. The information processing apparatus according to claim 2, wherein
the information processing apparatus is communicably connected with a first execution apparatus and a second execution apparatus both configured to execute the execution object created on a basis of the program file,
wherein the one or more processors are further configured to cause the first execution apparatus to execute the execution object created on a basis of the program file recorded in the repository at the time of receiving the request, to measure the processing load of the execution object, and
wherein the one or more processors are further configured to cause the second execution apparatus to execute the provisional execution object, to measure the processing load of the provisional execution object in parallel with the acquisition of the reference information.

4. The information processing of claim 3, wherein the one or more processors are further configured to cause the first execution apparatus to execute previously built execution objects in different versions prior to the execution of the execution object to perform multiple acquisitions of the reference information.

5. The information processing apparatus according to claim 1, wherein one or more processors are further configured to measure the processing load of the execution object created at least at the time of receiving the request and at least at another time that is earlier than the time of receiving the request on a basis of the program file recorded in the repository, and to acquire a result of each measurement as each reference information, and
wherein the one of more processors are further configured to verify the processing load information regarding the provisional execution object by comparing each acquired reference information with the processing load information regarding the provisional execution object.

6. The information processing apparatus of claim 1, wherein acquiring reference information comprises acquiring reference information multiple times,
wherein measuring the processing load comprises:
creating and providing a provisional execution object based on the program file related to the request multiple times; and
acquiring the processing load information multiple times, and
wherein verifying the processing load comprises comparing distribution of the acquired reference information multiple times with distribution of the obtained load information multiple times.

7. The information processing apparatus of claim 1, wherein the one or more processors are configured to record the reference information and the processing load information as a log, the log comprising a date and a time of each measurement, information identifying a program update related to each measurement, and the processing loads of each measurement associated with one another.

8. A control method for an information processing apparatus that manages a repository to which a program file is recorded, the control method comprising:
receiving a request to update a program file recorded in the repository;
acquiring, in a predetermined manner at a time of receiving the request, reference information regarding a processing load of an execution object based on the program file, wherein the reference information regarding the processing load of the execution object is based on a first elapsed time from a time of execution of the execution object to a time when a predetermined screen appears following the execution of the execution object;
creating a provisional execution object based on the program file related to the request;
measuring the processing load of the provisional execution object to acquire a result of the measurement as processing load information, wherein the processing load information regarding the provisional execution object is based on a second elapsed time from a time of execution of the provisional execution object to a time when the predetermined screen appears;
verifying the processing load information regarding the provisional execution object on a basis of the acquired reference information; and
subjecting a result of the verification to a predetermined process.

9. The control method of claim 8, further comprising:
measuring the processing load of the execution object created on a basis of the program file recorded in the repository at the time of receiving the request; and
acquiring the result of the measurement as the reference information.

10. The control method of claim 9, further comprising:
communicating with a first execution apparatus to cause the first execution apparatus to execute the execution object created on a basis of the program file recorded in the repository at the time of receiving the request, to measure the processing load of the execution object; and
communicating with a second execution apparatus to cause the second execution apparatus to execute the provisional execution object, to measure the processing load of the provisional execution object in parallel with the acquisition of the reference information.

11. The control method of claim 10, further comprising:
causing the first execution apparatus to execute previously built execution objects in different versions prior to the execution of the execution object to perform multiple acquisitions of the reference information.

12. The control method of claim 8, further comprising:
measuring the processing load of the execution object created at least at the time of receiving the request and at least at another time that is earlier than the time of receiving the request on a basis of the program file recorded in the repository;
acquiring a result of each measurement as each reference information; and
verifying the processing load information regarding the provisional execution object by comparing each acquired reference information with the processing load information regarding the provisional execution object.

13. The control method of claim 8, wherein acquiring reference information comprises acquiring reference information multiple times,
wherein measuring the processing load comprises:
creating and providing a provisional execution object based on the program file related to the request multiple times; and
acquiring the processing load information multiple times, and
wherein verifying the processing load comprises comparing distribution of the acquired reference information multiple times with distribution of the obtained load information multiple times.

14. The control method of claim 8, further comprising recording the reference information and the processing load information as a log,
wherein the log comprises a date and a time of each measurement, information identifying a program update related to each measurement, and the processing loads of each measurement associated with one another.

15. A non-transitory, computer readable storage medium containing a program which, when executed by a computer, causes the computer to perform a control method for managing a repository to which a program file is record, the method comprising:
receiving a request to update a program file recorded in the repository;
acquiring, in a predetermined manner at a time of receiving the request, reference information regarding a processing load of an execution object based on the program file, wherein the reference information regarding the processing load of the execution object is based on a first elapsed time from a time of execution of the execution object to a time when a predetermined screen appears following the execution of the execution object;
creating a provisional execution object based on the program file related to the received request;
measuring the processing load of the provisional execution object to acquire a result of the measurement as processing load information, wherein the processing load information regarding the provisional execution object is based on a second elapsed time from a time of execution of the provisional execution object to a time when the predetermined screen appears; and
verifying the processing load information regarding the provisional execution object on a basis of the acquired reference information, wherein
a result of the verification is subjected to a predetermined process.

16. The non-transitory, computer readable storage medium of claim 15, wherein the method further comprises:
measuring the processing load of the execution object created on a basis of the program file recorded in the repository at the time of receiving the request; and
acquiring the result of the measurement as the reference information.

17. The non-transitory, computer readable storage medium of claim 16, wherein the method further comprises:
communicating with a first execution apparatus to cause the first execution apparatus to execute the execution object created on a basis of the program file recorded in the repository at the time of receiving the request, to measure the processing load of the execution object; and
communicating with a second execution apparatus to cause the second execution apparatus to execute the provisional execution object, to measure the processing load of the provisional execution object in parallel with the acquisition of the reference information.

18. The non-transitory, computer readable storage medium of claim 15, wherein the method further comprises:
measuring the processing load of the execution object created at least at the time of receiving the request and at least at another time that is earlier than the time of receiving the request on a basis of the program file recorded in the repository;
acquiring a result of each measurement as each reference information; and
verifying the processing load information regarding the provisional execution object by comparing each acquired reference information with the processing load information regarding the provisional execution object.

19. The non-transitory, computer readable storage medium of claim 15, wherein acquiring reference information comprises acquiring reference information multiple times, wherein measuring the processing load comprises:
creating and providing a provisional execution object based on the program file related to the request multiple times; and
acquiring the processing load information multiple times,
wherein verifying the processing load comprises comparing distribution of the acquired reference information multiple times with distribution of the obtained load information multiple times.

20. The non-transitory, computer readable storage medium of claim 15, wherein the method further comprises:
  causing the first execution apparatus to execute previously built execution objects in different versions prior to the execution of the execution object to perform multiple acquisitions of the reference information.

\* \* \* \* \*